3,285,852
CYCLOHEXYLAMINE SALT OF PETROLEUM SULFONIC ACID CORROSION INHIBITOR FOR FUELS AND LUBRICANTS, COMPOSITIONS AND METHOD OF PREPARATION
James T. Gragson, Bartlesville, Okla., assignor to Phillips Petroleum Company, a corporation of Delaware
No Drawing. Filed Aug. 22, 1963, Ser. No. 303,954
10 Claims. (Cl. 252—33)

This invention relates to inhibition of corrosion. In one of its aspects it relates to the preparation of a corrosion inhibitor. In another of its aspects, the invention relates to a new corrosion inhibitor suitable for use in fluids such as fuels and lubricants. In a further aspect of the invention, it relates to fuels and lubricants or other fluids containing a corrosion inhibitor. In a still further aspect of the invention it relates to the preparation of a cyclohexylamine salt from a calcium petroleum sulfonate. In a still further aspect of the invention a cyclohexylamine salt of a calcium petroleum sulfonate is prepared by admixing a calcium petroleum sulfonate, an organic solvent and water with cyclohexylamine and then carbonating to obtain a reaction mass containing the desired product. In a still further aspect of the invention, it relates to a lubricant containing a cyclohexylamine salt as herein set forth and described. Further, in another aspect of the invention, it relates to a fuel containing such a salt.

A number of amine derivatives have been disclosed as corrosion inhibitors. It has now been discovered that the petroleum sulfonate salt of cyclohexylamine, unexpectedly, is particularly useful as a corrosion inhibiting additive in fuels and lubricants. This is indeed surprising in view of the poor performance obtained using salts of petroleum sulfonic acid and other amines. Compositions which have been obtained, especially those containing motor lubricants, have been found to exhibit greatly superior corrosion resisting properties compared with similar salts containing ethanolamine or N-oleyltrimethylenediamine.

It is an object of this invention to provide a novel corrosion inhibitor. It is a further object of this invention to provide a fuel containing a corrosion inhibitor. It is a further object of this invention to provide a lubricant containing a corrosion inhibitor. It is a further object of this invention to provide a method for the production of an improved corrosion inhibitor.

Other aspects, objects and several advantages of the present invention are apparent from the study of this disclosure and the appended claims.

According to the present invention, the cyclohexylamine salt is prepared by the action of cyclohexylamine and carbon dioxide on an oil soluble salt of petroleum sulfonic acid; for example, calcium petroleum sulfonate. The reaction is effected in the presence of some water.

In practice, an oil solution of a calcium or barium petroleum sulfonate is agitated with water and cyclohexylamine. A stream of carbon dioxide is passed into the system resulting in the simultaneous formation of the amine salt and precipitation of calcium carbonate. Benzene or a similar diluent or solvent may be present advantageously. Desirably, also, there is present an emulsion breaker within the system. A number of materials can be used and included among these are alcohols, ketones, or esters.

Following carbonation, the mixture is dehydrated and filtered to yield a clear oil solution of the cyclohexylamine salt. Volatiles such as alcohol or diluents can be readily removed by stripping.

The metal petroleum sulfonates which are suitable for use in this invention can be prepared by conventional methods. U.S. Patents 2,909,563 issued October 20, 1959, Whitney, and 3,023,231 issued February 27, 1962, Logan, describe petroleum sulfonates suitable as starting materials for the purposes of the present invention. Particularly considered now are the calcium petroleum sulfonates prepared from petroleum lubricating oil fractions having molecular weight (average) of about 720 and yielding calcium petroleum sulfonates having an equivalent weight of approximately 980 or thereabouts.

As noted, the cyclohexylamine petroleum sulfonate salt of the invention is especially useful as a corrosion inhibiting additive in fuels and lubricants and this includes oleaginous lubricants which are naturally formed as well as synthetic materials. The lubricant can be hydrocarbon oil obtained from a paraffinic, naphthetic, Mid-Continent or Coastal stock and/or mixtures thereof and preferably from base stocks which have been highly refined. The viscosity of these oils can vary. The viscosity will usually be in the range of from about 50 SUS at 100° F. to about 200 SUS at 210° F. Synthetically derived lubricants or oils include olefin polymers, silicone fluids, organic phosphates, organic esters and the like.

The additive of this invention generally is used in amounts of about 0.1 to about 10 vol. percent, preferably about 1 to about 4 vol. percent, based on the final lubricant. The lubricant may also contain a variety of other conventional additives such as V.I. improvers, thickeners, pour point modifiers, detergents, deposit modifiers and the like generally in amounts of from about 0.01 to about 15 vol. percent based on the final lubricant.

It is also within the scope of this invention to provide fuel compositions containing the invention amine salt. Thus motor, diesel, furnace and other hydrocarbon fuels containing from 0.01 to about 5 vol. percent cyclohexylamine salt based on the total fuel can be prepared. Such fuels offer protection against corrosion to carburetors, metering devices and other forms of apparatus storing, handling or utilizing these fuels.

EXAMPLES

The following specific examples illustrate the advantages of the process and product of this invention. In these examples, calcium petroleum sulfonate was converted to several amine salts of petroleum sulfonic acid by contact with the desired amine in the presence of carbon dioxide and a diluent.

The calcium petroleum sulfonate was prepared by the sulfonation of a propane fractionated, phenol extracted and dewaxed Mid-Continent lubricating oil fraction of about 203 SUS viscosity at 210° F. and a viscosity index of about 93. This charge stock was sulfonated with a solution of about 10 weight percent $SO_3$ in liquid $SO_2$ at 110° F. for about 10 minutes. The $SO_3$ to oil weight ratio was about 0.08 to 1. The sulfonation effluent was flashed to remove $SO_2$, leaving a solution of about 48 weight percent petroleum sulfonic acid in unsulfonated oil. This mixture was then diluted with Stoddard solvent, a petroleum naphtha, and neutralized by addition of an aqueous slurry of calcium hydroxide more than chemically equivalent to the sulfonic acid present. This mixture was stabilized by heating, followed by drying in a flash tower. The product recovered at this point is termed "dryer tower bottoms" and contains 19–20 weight percent each of calcium petroleum sulfonate and unsulfonated oil, and about 0.76 weight percent calcium hydroxide, about 0.24 weight percent water; and the remainder is Stoddard solvent. The dryer tower bottoms are diluted with additional Stoddard solvent and filtered to remove the solids. The Stoddard solvent is then removed to produce a concentrate which is substantially 50 weight percent calcium petroleum sulfonate and 50 weight percent unsulfonated oil, this being the usual commercial form of this material.

Since this unsulfonated oil component is carried through the conversion step by which the calcium salt is converted to the amine salt, the resulting amine salt additive is also a similar concentrate. Thus, in succeeding samples and tables it is to be understood that the sulfonate additives shown are "concentrates" although not specifically so designated in each context.

EXAMPLE 1

A 100 gram quantity of the above described calcium petroleum sulfonate concentrate (having an equivalent weight of about 980 on a diluent free basis) was blended with 150 ml. benzene, 50 ml. water, 20 ml. methanol, and 3 grams cyclohexylamine. This mixture was carbonated, with agitation, for 4 hours with a stream of gaseous $CO_2$. The resulting slurry was dehydrated by azeotropic distillation, further diluted with benzene and centrifuged to remove the precipitated solids. The clarified oil was then stripped by distillation to about 300° F. at reduced pressure to remove volatile material. Several concentrations of the amine salt were prepared in a SAE 10 stock neutral oil (a solvent refined petroleum overhead product suitable for compounding SAE 10 grade lubricating oil). The solutions were tested in the Sohio Rust Test. This test is similar to that of ASTM D665 except that the specimen is exposed to a 1 percent acetic acid solution. The results were as follows:

*Cyclohexylamine salt evaluation*

| Blend (weight percent in 10 stock): | Rust rating (10=rust free) |
|---|---|
| Cyclohexylamine petroleum sulfonate (1%) | 6.0 |
| Cyclohexylamine petroleum sulfonate (2%) | 8.0 |
| Cyclohexylamine petroleum sulfonate (4%) | 7.5 |
| Calcium petroleum sulfonate (4%) | 3.0 |

These data show that a lubricating oil containing cyclohexylamine petroleum sulfonate offers a high degree of protection from corrosion. As can be seen here, this protection is significantly greater than that offered by the unconverted calcium salt.

EXAMPLE 2

In a manner largely identical with that of Example 1, the ethanolamine salt of petroleum sulfonic acid was prepared. A 100 g. quantity of calcium salt was blended with 2.2 g. ethanolamine, 50 ml. water, 40 ml. methanol, carbonated for 4 hours, dried, diluted centrifuged, and stripped. Similar Sohio Rust Test evaluations were made of the recovered product in 10 stock.

*Ethanolamine salt evaluation*

| Blend (weight percent in 10 stock): | Rust rating (10=rust free) |
|---|---|
| 1 | 3.5 |
| 2 | 3.5 |
| 4 | 3.8 |

These data show that little or no rust protection is offered by this compound and that is not at all comparable to its cyclohexylamine analog.

EXAMPLE 3

In a manner largely identical to that of Example 1, the N-oleyltrimethylenediamine salt of petroleum sulfonic acid was prepared. A 100 g. quantity of the calcium salt was blended with 50 g. water, 50 ml. isopropyl alcohol, 11 g. N-oleyltrimethylenediamine, carbonated 3 hours, dried, diluted, centrifuged, and stripped. The pH of the product was about 6.5 and an additional 1 g. of diamine was added to about 55 g. of the recovered product. This material was also evaluated in the Sohio Rust Test after dilution in 10 stock lubricating oil.

*N-oleyltrimethylenediamine salt evaluation*

| Blend (weight percent in 10 stock): | Rust rating (10=rust free) |
|---|---|
| 1 | 3.5 |
| 2 | 3.5 |
| 4 | 3.5 |

These data show that the N-oleyltrimethylenediamine salt is also ineffective as a rust inhibitor in a lubricating oil.

EXAMPLE 4

The cyclohexylamine salt was prepared by direct neutralization of the sulfonic acid. A 25 g. quantity of petroleum sulfonic acid was diluted with benzene and neutralized with cyclohexylamine. Its black color changed to a red color. The benzene was then stripped from the salt. This material was also evaluated in the Sohio Rust Test with the following results:

*Directly prepared cyclohexylamine salt evaluation*

| Blend (weight percent in 10 stock): | Rust rating (10=rust free) |
|---|---|
| 2 | 3.5 |
| 4 | 3.2 |

These data show that the salt obtained by direct neutralization of the sulfonic acid reagent is not suitable for use in a lubricating oil, the product being not equivalent to that produced by converting the calcium petroleum sulfonate to the cyclohexylamine salt in the presence of carbon dioxide.

Reasonable variation and modification are possible within the scope of the foregoing disclosure and the appended claims to the invention the essence of which is that cyclohexylamine salt of petroleum sulfonic acid prepared by the action of cyclohexylamine on an oil soluble salt of petroleum sulfonic acid, especially calcium petroleum sulfonate, exhibits good corrosion inhibition properties for fuels, lubricants and the like.

I claim:

1. A lubricant composition containing as a corrosion inhibitor a cyclohexylamine salt of a petroleum sulfonic acid obtained by carbonating a mixture of a calcium petroleum sulfonate and cyclohexylamine.

2. A normally liquid hydrocarbon fuel composition containing as a corrosion inhibitor a cyclohexylamine salt of a petroleum sulfonic acid obtained by carbonating a mixture of a calcium petroleum sulfonate and cyclohexylamine.

3. Cyclohexylamine salt of petroleum sulfonic acid prepared by action of cyclohexylamine and carbon dioxide on an oil soluble salt of petroleum sulfonic acid.

4. Cyclohexylamine salt prepared by the action of cyclohexylamine and carbon dioxide on a calcium petroleum sulfonate prepared from a petroleum lubricating oil fraction having a molecular weight (average) of about 720, said calcium petroleum sulfonate having an equivalent weight of about 980.

5. A method of preparing a cyclohexylamine salt of a petroleum sulfonic acid suitable for use as a corrosion inhibitor additive for fuels and lubricants which comprises bringing together in a solvent medium calcium petroleum sulfonate and cyclohexylamine and then carbonating the mixture thus obtained to produce said cyclohexylamine salt.

6. A method for the preparation of a cyclohexylamine salt suitable for use as a corrosion inhibitor which comprises blending together a calcium petroleum sulfonate, cyclohexylamine benzene, water and methanol, and then carbonating the blend with a gaseous carbon dioxide for a time sufficient to produce the cyclohexylamine salt obtaining a slurry dehydrating said slurry and removing precipitated solids obtaining an oil, stripping the oil of voluble material and recovering the salt thus prepared.

7. The cyclohexylamine salt of a metal petroleum sulfonate obtained by the action of cyclohexylamine and carbon dioxide on an oil soluble metal petroleum sulfonate.

8. Method of preparing a corrosion inhibited hydrocarbon composition comprising:
  contacting calcium petroleum sulfonate, cyclohexylamine, and carbon dioxide in a solvent medium comprising a hydrocarbon.

9. Method of claim 8 wherein said hydrocarbon is a lubricant.

10. Method of claim 8 wherein said hydrocarbon is a liquid fuel.

References Cited by the Examiner
UNITED STATES PATENTS

| | | | |
|---|---|---|---|
| 2,533,301 | 12/1950 | Watkins | 252—33 X |
| 3,005,847 | 10/1961 | Bray | 252—33 X |
| 3,027,325 | 3/1962 | McMillen et al. | 252—33 |

DANIEL E. WYMAN, *Primary Examiner.*

P. P. GARVIN, *Assistant Examiner.*